(12) United States Patent
Price et al.

(10) Patent No.: US 9,047,026 B2
(45) Date of Patent: Jun. 2, 2015

(54) LABELING INSERTED PAGES WITHIN PRINT PREVIEWS OF A PRINT JOB

(75) Inventors: Stephen G. Price, Longmont, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 755 days.

(21) Appl. No.: 13/210,715

(22) Filed: Aug. 16, 2011

(65) Prior Publication Data
US 2013/0044348 A1 Feb. 21, 2013

(51) Int. Cl.
*G06F 3/12* (2006.01)
(52) U.S. Cl.
CPC ............ *G06F 3/1208* (2013.01); *G06F 3/1256* (2013.01); *G06F 3/1258* (2013.01)
(58) Field of Classification Search
CPC ............ H04N 1/00161; H04N 1/0044; H04N 1/00456; G06F 3/1208; G06F 3/1256; G06F 3/1258; G06F 3/12
USPC .................................................. 358/1.1–3.29
See application file for complete search history.

(56) References Cited

U.S. PATENT DOCUMENTS

| | | |
|---|---|---|
| 6,927,865 B1 | 8/2005 | Kujirai et al. |
| 2006/0001720 A1* | 1/2006 | Yamamura .................... 347/101 |
| 2006/0280538 A1* | 12/2006 | Barry et al. ..................... 400/62 |
| 2007/0211296 A1* | 9/2007 | Toda ............................ 358/1.18 |
| 2008/0201378 A1 | 8/2008 | Nagahara et al. |
| 2010/0177339 A1* | 7/2010 | Wilsher ....................... 358/1.15 |
| 2011/0141506 A1* | 6/2011 | Sato ............................. 358/1.12 |

* cited by examiner

*Primary Examiner* — Marcellus Augustin
(74) *Attorney, Agent, or Firm* — Duft Bornsen & Fettig LLP

(57) ABSTRACT

Systems and methods are provided for labeling inserted pages within a print preview of a print job. The system receives print data comprising logical pages, and receives instructions for inserting pages among the logical pages of the print data. The system further receives a request for a print preview for the print data, identifies inserts for the print data based on the instructions, rasterizes the logical pages of the print data and the inserts to generate sheet images for the print preview, and includes non-printing marks in the sheet images for the inserts that distinguish the inserts from rasterized logical pages of the print data. The system further transmits the sheet images of the print preview.

17 Claims, 4 Drawing Sheets

LABELING INSERTED PAGES WITHIN PRINT PREVIEWS OF A PRINT JOB

FIELD OF THE INVENTION

The invention relates to the field of printing systems, and in particular, to previews for print jobs of a printing system.

BACKGROUND

In the field of printing systems, users desire that print jobs be consistently presented across a variety of printers and display devices. In order to ensure uniformity in presentation, print jobs include print data that is often defined according to uniform standards such as page description languages, which are meant to specifically indicate the positioning and structure of printed elements on a given page. Accompanying the print data may be a job ticket or other instructions for processing the print data of the job or processing the printed sheets of the job (e.g., stapling of the pages after print, hole-punching the pages, etc.)

Unfortunately, each printer or display may utilize different color schemes (e.g., RGB vs. CMYK), different resolutions, and different processing algorithms than its peers. This in turn means that the final product presented to a user by such devices may vary significantly. Because of this, users desire print previews that provide not only an indication of how the print job should appear according to the page description language, but also an indication of how the print job will actually be printed at a specific device. Using such print previews, a user may discover an issue with how a job will be printed before the job is initiated at a printer. For high-volume or expensive print jobs, reviewing a print preview for a job before initiating printing can potentially save a great deal of money and time.

Preferably, print previews are generated by the Raster Image Processors (RIPs) of the device that is intended to print a given job. These print previews reliably show how the print job will be printed, because they are generated by the image processing components of the device that will actually be printing the job. Print previews are generally desirable to users, and users desire methods and systems that enhance the functionality of print previews within printing systems.

SUMMARY

Embodiments described herein indicate the presence of inserted pages ("inserts") within a print preview by using non-printing marks. These non-printing marks distinguish rasterized inserts from rasterized pages of print data for a print job. Using this technique, a user may quickly preview not only the printed pages of the print data itself, but also the pages intended for insertion into the job (e.g., cover pages, divider pages, and others defined in a job ticket accompanying the print data). This allows a user to detect and compensate for errors relating to inserts during the print preview process.

One embodiment is a system that labels inserts in a print preview of a print job by using non-printing marks. The system includes an interface able to receive print data comprising logical pages, and to receive instructions for inserting pages among the logical pages of the print data. The system further includes a control unit able to receive a request for a print preview for the print data, to identify inserts for the print data based on the instructions, to rasterize the logical pages of the print data and the inserts to generate sheet images for the print preview, and to include non-printing marks in the sheet images for the inserts that distinguish the inserts from the rasterized logical pages of the print data. The control unit is further able to transmit the sheet images of the print preview.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
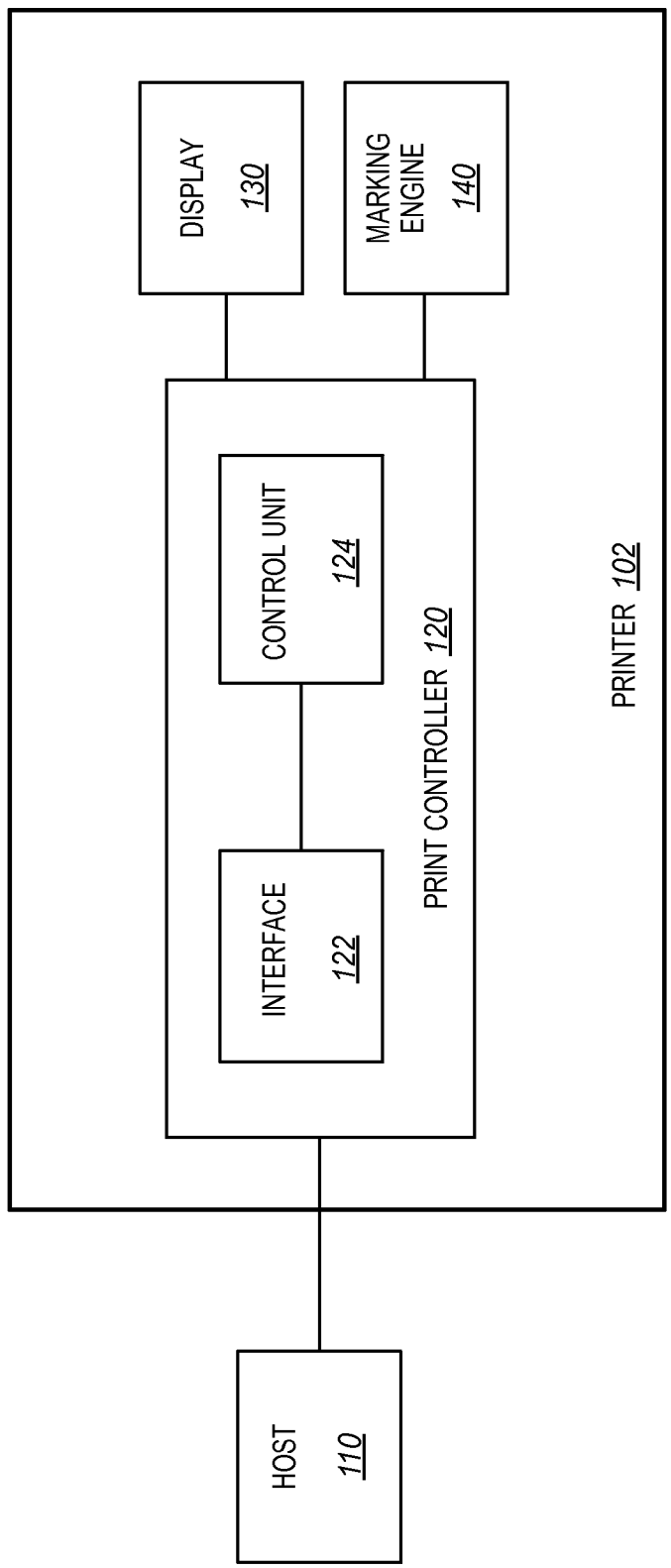
FIG. 1 is a block diagram of a printer in an exemplary embodiment.

FIG. 1 is a block diagram of a printer 100 in an exemplary embodiment. In this embodiment, printer 100 is communicatively coupled with host 110, and printer 100 comprises print controller 120, display 130, and marking engine 140. Host 110 may comprise a computer, a print server, a software application, or any other functional component capable of submitting a print job. Print controller 120 comprises any system, device, or component operable to manage the operations of a print-related device. In a preferred embodiment, print controller 120 implements the raster image processing logic and software/hardware actually used by the device at which incoming print jobs are intended to be printed (e.g., printer 100). However, in an alternate embodiment, print controller 120 is implemented on systems that are remote from printer 100, and is configured to mimic the image processing performance of RIPs located at printer 100.

In this embodiment, print controller 120 comprises interface 122 and control unit 124. Interface 122 comprises devices for receiving incoming print jobs and requests from host 110. Interface 122 is operable to receive print jobs comprising both print data and a job ticket having instructions for processing the print data. Furthermore, interface 122 is operable to forward incoming print jobs and requests from host 110 to control unit 124 for processing. Interface 122 may be operable to communicate with one host 110 or multiple hosts (e.g., via a print server), and may communicate with host 110 via a direct physical link or a networked communication pathway. Interface 122 may be further operable to perform initial formatting of incoming print jobs and requests in order to prepare them for processing by control unit 124.

Control unit 124 comprises systems operable to generate a rasterized preview of print data for an incoming job. For example, control unit 124 may comprise one or more Raster Image Processors (RIPs) capable of interpreting and rasterizing incoming print data encoded according to a page description language. Control unit 124 may further comprise a processor implementing logic for directing the operation of one or more RIPs. Display 130 comprises any device, system, or component operable to present a print preview for an incoming print job to a user. For example, display 130 may comprise a monitor, screen, terminal, television, projector, or other device.

Marking engine 140 may comprise any combination of printing machinery operable to mark an image onto a sheet. Marking engine 140 may use, for example, toner or ink to mark an image onto a sheet. When print previews are generated by print controller 120 for viewing at display 130, the print previews are intended primarily to indicate how marking engine 140 will actually print the job onto physical sheets of media.

Note that it is not necessary that marking engine 140 and display 130 be physically connected to print controller 120 or otherwise integrated into the same printer. In some embodiments, marking engine 140 and/or display 130 are located remotely from print controller 120, and are communicatively coupled with print controller 120 via a networked communication channel.

Using print controller 120 described above, a user may beneficially view rasterized versions of inserted pages when previewing a print job. Furthermore, these rasterized sheet images of inserted pages, included within the print preview, will include non-printing marks indicating that the page has been inserted into the print job. For example, the rasterized images of the inserted pages may include a label or symbol stating that the page is an "insert." This allows a user to quickly identify inserted pages in the job and distinguish them from the print data for the job.

Further details of the operation of print controller 120 will be discussed with regard to FIG. 2. Assume, for this embodiment, that print controller 120 initializes to receive incoming print jobs from host 110. Print controller 120 is operable to rasterize incoming print jobs, and to direct marking engine 140 to print the rasterized jobs onto physical sheets of media. Print controller 120 is further operable to generate print previews that describe how marking engine 140 will physically print incoming jobs.

Figure 2:
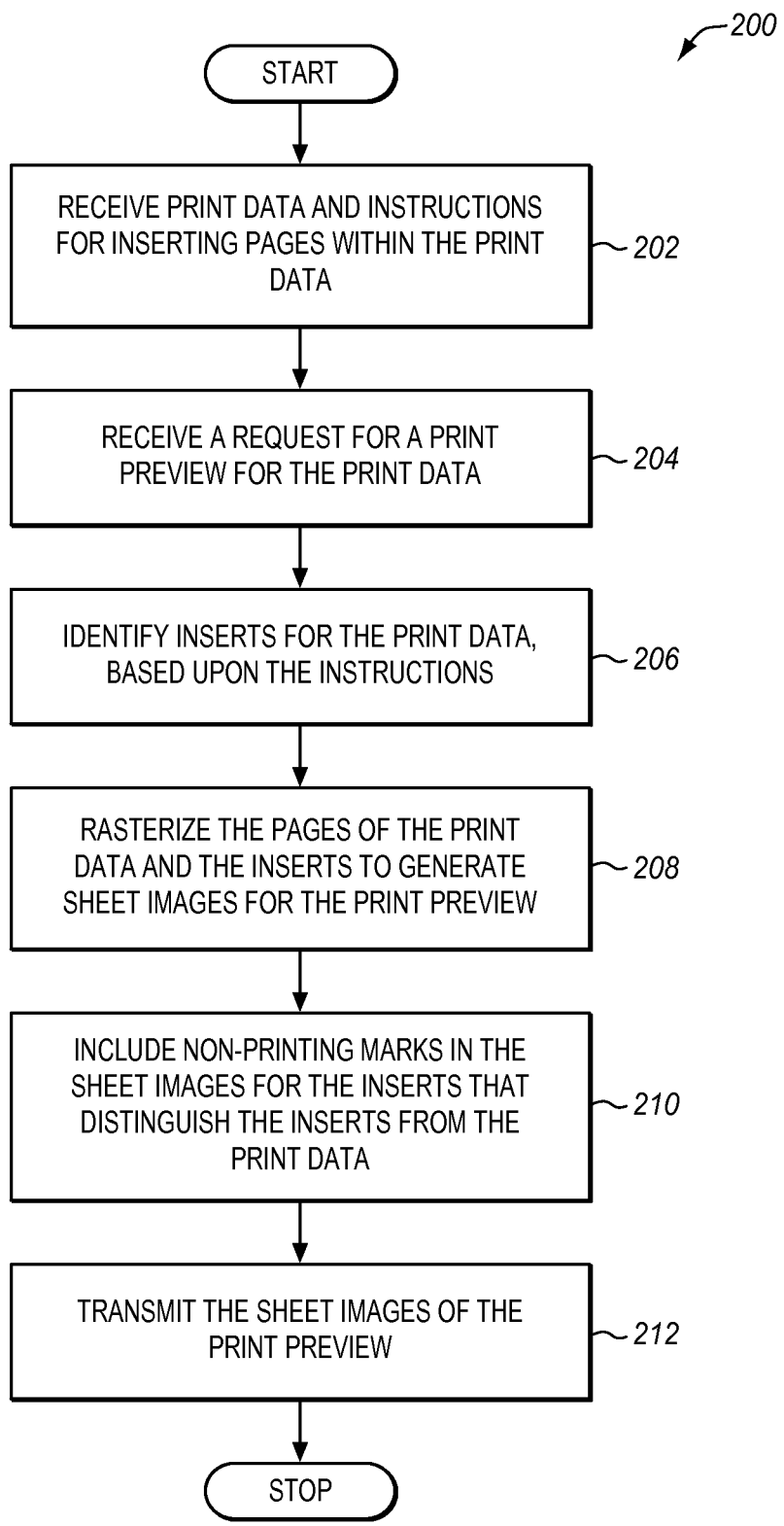
FIG. 2 is a flowchart illustrating a method for labeling pages inserted into a print job in an exemplary embodiment.

FIG. 2 is a flowchart illustrating a method 200 for labeling pages inserted into a print job in an exemplary embodiment. The steps of method 200 are described with reference to print controller 120 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, interface 122 of print controller 120 receives print data comprising logical pages. This print data may be encoded according to a page description language (e.g., PostScript). Print controller 120 further receives instructions for inserting pages among the logical pages of the print data. These instructions may be received, for example, in a job ticket accompanying the print data, such as a job ticket encoded according to the Job Definition Format (JDF) standard. The instructions indicate that pages should be inserted among the pages of the print data. These inserts may, for example, be custom pre-printed sheets used to indicate boundaries within a print job. The sheets for the inserts may be kept at a specific tray available to the printer for the print job. Note that inserts are distinct from the pages of the print data itself because the inserts are separated from the print data at the time they are received by print controller 120. Additionally, the inserts are placed in the print job based upon the already-existing order of pages in the print data. For example, an insert may be a page placed after page four of the print data, or before page seven of the print data. Thus, the inserts are not a part of the logical pages of print data, but are inserted between the pages of the print data based upon instructions in the job ticket. In some embodiments, the inserts are not printed by printer 100, but are rather pre-printed documents physically placed between pages of the print job. In other embodiments, the inserts may be printed by printer 100 itself, based upon the instructions in the job ticket. With this distinction in mind, it can be understood that inserts are placed among the pages of already-generated print data, and are not already a part of the print data at the time of a job's submission for rasterization and printing.

In step 204, control unit 124 identifies a request for a print preview for the print data. This request may be received, for example, from host 110 via interface 122.

In step 206, control unit 124 identifies inserts for the print data, based on the instructions. In this step, control unit 124 may parse a received job ticket or other data associated with the print job in order to determine how many inserts have been requested, where the inserts should be placed among the print data of the job, and what type of inserts should be used.

In step 208, control unit 124 rasterizes the logical pages of the print data and the inserts to generate sheet images for the print preview. The sheet images of the logical pages are rasterized versions of the print data for those logical pages. Furthermore, the sheet images are tailored to the rasterization capabilities of marking engine 140. Thus, the sheet images show the pages of the print job as they will be printed by marking engine 140. Generating rasterized versions of the logical pages of the print data is a fairly straightforward process because the print data itself includes instructions describing the location and properties of text and images on the page.

Generating an insert to accompany the print data may be a more complicated process. A job ticket might provide only a brief description of the insert itself (e.g., the instruction itself may only be to "insert cover page after page four"), leaving some ambiguity as to what, if any, sort of rasterized image should be generated for the insert. Further complicating the issue, an insert may be a pre-printed sheet that resides within a tray used by marking engine 140, and the sheets in the tray may already include printed graphics (i.e., the inserted sheets may be pre-printed "cover sheets" or "separator sheets"). In such circumstances, no printing will actually occur on the inserted sheets. However, a user may still desire to see an approximation of what the insert will look like when it has been included with the printed sheets for the print job.

To better illustrate the characteristics of the print job, in step 210 control unit 124 inserts non-printing marks in the rasterized sheet images for the inserts. These non-printing marks distinguish the sheet images for the inserts from the rasterized logical pages (i.e., sheet images) for the print data. A job ticket included with the print data may comprise instructions to generate or apply the non-printing graphical marks, or internal logic at control unit 124 may dictate the generation and placement of these marks. A non-printing graphical mark may comprise, for example, text, images, or some combination thereof that labels an inserted page as an insert. Control unit 124 may include pre-rasterized versions of these marks in memory, or host 110 may include instructions for generating the marks at the job ticket accompanying the print data. Including non-printing marks in the preview for the print job helps a user to quickly identify inserted pages for the print job. At the same time, no ink is wasted actually printing these marks onto a sheet. These non-printing marks may include, for example, a designation that the insert has been pre-printed, an indication of the physical properties (size, weight, color, etc.) of the sheets used for the insert, the tray used by marking engine 140 for inserts, and other properties. In a further embodiment, the non-printing marks may include graphics indicating post-processing that is to be performed on the printed sheets of the print job. For example, a graphical mark may be included with the print preview for an inserted page to indicate the location and size of holes that will be punched into the insert.

The non-printing marks may be consistently placed at the same location along all inserts, thereby making it easier for a user to identify these pages as inserts. In one embodiment, the non-printing marks are placed so as to reduce/minimize any overlap with marks on the sheet image that will actually be printed. In a further embodiment, the non-printing marks are placed outside of the printable area of the page to minimize interference with marks intended for printing on the sheet for the inserted page. Additionally, the non-printing marks may be made into watermarks or other subtle features so as to minimize their interference with marks intended for printing.

In further embodiments, it may be desirable to clearly distinguish marks intended for printing from non-printing marks at the insert. This may be accomplished by using a unique color for non-printing marks (e.g., highlighting the marks in a given color), using a different line type for the non-printing marks (e.g., making the marks out of dashed or dotted lines), applying a unique border to the non-printing marks, or using a unique lightness or brightness for the non-printing marks.

In step 212, control unit 124 transmits the sheet images of the print preview, including the non-printing marks that label the inserted pages as inserts, to display 130 for presentation to a user.

Thus, with the method described above, a user may receive print previews for print jobs, wherein the previews include rasterized sheet images for pages that have been inserted into the job. Because sheet images for the inserts are included within the print preview, a user may review both the print data and the inserts to check for potential printing errors. Additionally, rasterizing the inserts of the job at print controller 120 instead of a host or third party application provides a benefit, because it ensures that sheet images for inserted pages are uniformly displayed, regardless of the application that is used for viewing the print preview.

EXAMPLES

In the following examples, additional processes, systems, and methods are described in the context of inserting a sheet image for an insert into the rasterized pages of a print job.

Figure 3:
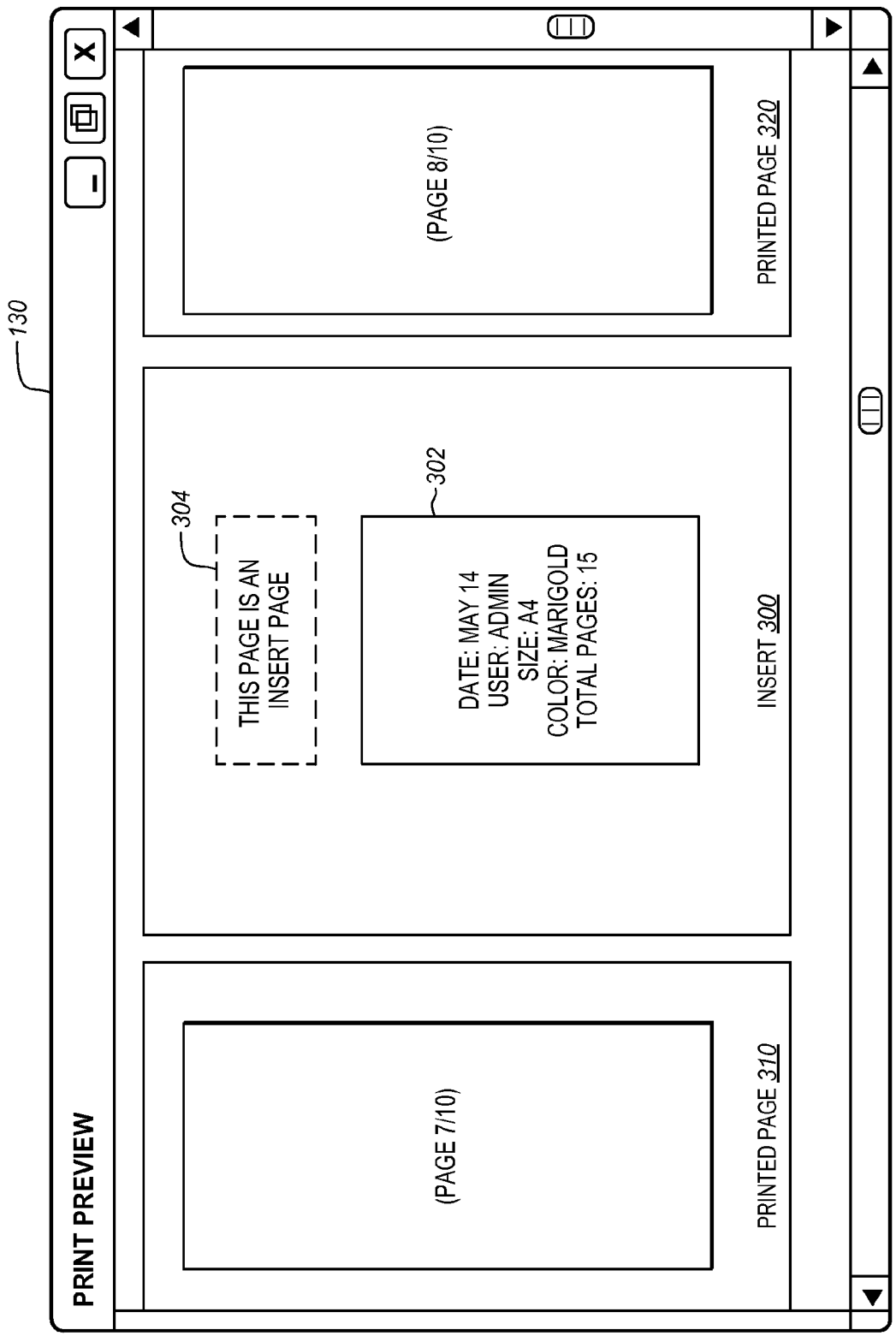
FIG. 3 is a block diagram illustrating a print preview an exemplary embodiment.

FIG. 3 is a block diagram illustrating a print preview in an exemplary embodiment. The print preview is shown to a user via display 130. Assume, for this embodiment, that a print controller has received a print job comprising logical pages of print data and a job ticket. The job ticket indicates that a page should be inserted into the print preview after page seven of the print data. The job ticket also requests that the insert include data describing various characteristics of the print job. These characteristics include, for example: the date, the user that submitted the print job, the paper size, the paper color, and the total number of pages in the job. All of this information is included with the job ticket. At some later time, a user requests that a preview be generated for this print job. This request may be received, for example, via an application or browser available to the user.

A control unit of the print controller initiates generation of a preview by rasterizing the pages of the print job. Additionally, the control unit generates instructions for creating a sheet image for the requested insert, and then uses a RIP to rasterize these marks onto a sheet image for insert 300. These marks 302 that are added to the sheet image for insert 300 are intended to be printed, and include customized information that indicates, for example, a time and date, a user that initiated the print job, a number of pages in the print job, and other characteristics. Because the control unit has determined that this rasterized version of the print job is being used for a print preview (instead of being used for actual printing at a marking engine), the control unit adds non-printing marks 304 in the sheet image for insert 300. In particular, the control unit adds text stating that "this page is an insert page." To distinguish non-printing marks 304 from marks 302, the control unit adds a border to non-printing marks 304. In this example, the border comprises a dashed line. In this embodiment, the sheet image for insert 300 is accompanied in the print preview by sheet images for printed page 310 and printed page 320. Thus, a user that reviews the print preview may quickly identify that insert 300 has been inserted into the print job, and also may quickly determine that non-printing marks 304 will not appear in the actual, printed version of the print job.

Figure 4:
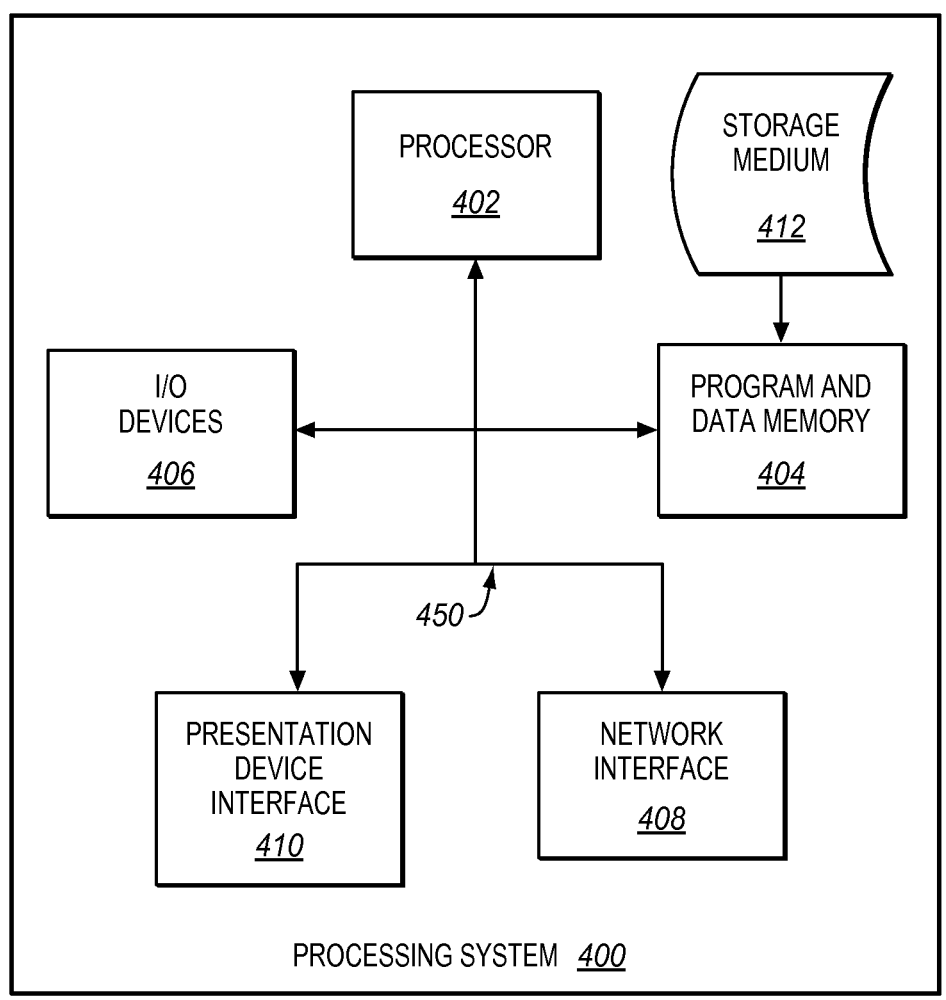
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print controller 120 to perform the various operations disclosed herein. FIG. 4 illustrates a processing system operable to execute a computer readable medium embodying programmed instructions to perform desired functions in an exemplary embodiment. Processing system 400 is operable to perform the above operations by executing programmed instructions tangibly embodied on a computer readable storage medium 412. In this regard, embodiments of the invention can take the form of a computer program accessible via the computer-readable medium 412 providing program code for use by a computer or any other instruction execution system. For the purposes of this description, a computer readable storage medium 412 can be anything that can contain or store the program for use by the computer.

The computer readable storage medium 412 can be an electronic, magnetic, optical, electromagnetic, infrared, or semiconductor device. Examples of the computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 400, being suitable for storing and/or executing the program code, includes at least one processor 402 coupled to memory elements 404 through a system bus 450. The memory elements 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable the processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation devices, such as printing systems and displays for presentation of presentation data generated by processor 402.

Although specific embodiments were described herein, the scope of the invention is not limited to those specific embodiments. The scope of the invention is defined by the following claims and any equivalents thereof.

We claim:

1. A print controller, comprising,
an interface operable to receive print data comprising logical pages,
and to receive instructions for inserting pages among the logical pages of the print data; and
a control unit operable to receive a request for a print preview for the print data,
to identify inserts for the print data based on the instructions,
to rasterize the logical pages of the print data and the inserts to generate sheet images for the print preview,
to include non-printing marks in the sheet images for the inserts that distinguish the inserts from the rasterized logical pages of the print data,
and to transmit the sheet images of the print preview,
wherein the control unit is further operable to include the non-printing marks in a color that is different from colors used by marks intended for printing.

2. The print controller of claim 1, wherein:
the control unit is further operable to include the non-printing marks at locations to reduce overlap with marks intended for printing.

3. The print controller of claim 1, wherein:
the control unit is further operable to include the non-printing marks to indicate that an insert is a pre-printed sheet.

4. The print controller of claim 1, wherein:
the control unit is further operable to include the non-printing marks to indicate a tray that holds sheets used for the inserts.

5. The print controller of claim 1, wherein:
the control unit is further operable to include non-printing marks that comprise a predefined image.

6. The print controller of claim 1, wherein:
the control unit is further operable to include non-printing marks that comprise text.

7. The print controller of claim 1, wherein:
the control unit is further operable to include non-printing marks to identify a physical post-processing step performed upon sheets for the inserts.

8. A method for a print controller that processes print data for a print job, the method comprising:

receiving print data comprising logical pages and instructions for inserting pages among the logical pages of the print data;
receiving a request for a print preview for the print data;
identifying inserts for the print data, based on the instructions;
rasterizing the logical pages of the print data and the inserts to generate sheet images for the print preview;
including non-printing marks in the sheet images for the inserts, in a color that is different from colors used by marks intended for printing,
wherein the non-printing marks distinguish the inserts from the rasterized logical pages of the print data;
and transmitting the sheet images of the print preview.

9. The method of claim 8, further comprising:
including the non-printing marks at locations to reduce overlap with marks intended for printing.

10. The method of claim 8, further comprising:
including the non-printing marks to indicate that an insert is a pre-printed sheet.

11. The method of claim 8, further comprising:
including the non-printing marks to indicate a tray that holds sheets used for the inserts.

12. The method of claim 8, wherein:
the non-printing marks comprise a predefined image.

13. The method of claim 8, wherein: the non-printing marks comprise text.

14. The method of claim 8, further comprising
including non-printing marks to identify a physical post-processing step performed upon sheets for the inserts.

15. A non-transitory computer readable medium embodying programmed instructions which, when executed by a processor, are operable for performing a method comprising:
receiving print data comprising logical pages and instructions for inserting pages among the logical pages of the print data;
receiving a request for a print preview for the print data;
identifying inserts for the print data, based on the instructions;
rasterizing the logical pages of the print data and the inserts to generate sheet images for the print preview;
including non-printing marks in the sheet images for the inserts, in a color that is different from colors used by marks intended for printing,
wherein the non-printing marks distinguish the inserts from the rasterized logical pages of the print data;
and transmitting the sheet images of the print preview.

16. The medium of claim 15, wherein the method further comprises:
including the non-printing marks at locations to reduce overlap with marks intended for printing.

17. The medium of claim 15, wherein the method further comprises:
including the non-printing marks to indicate that an insert is a pre-printed sheet.

* * * * *